Patented Nov. 17, 1942

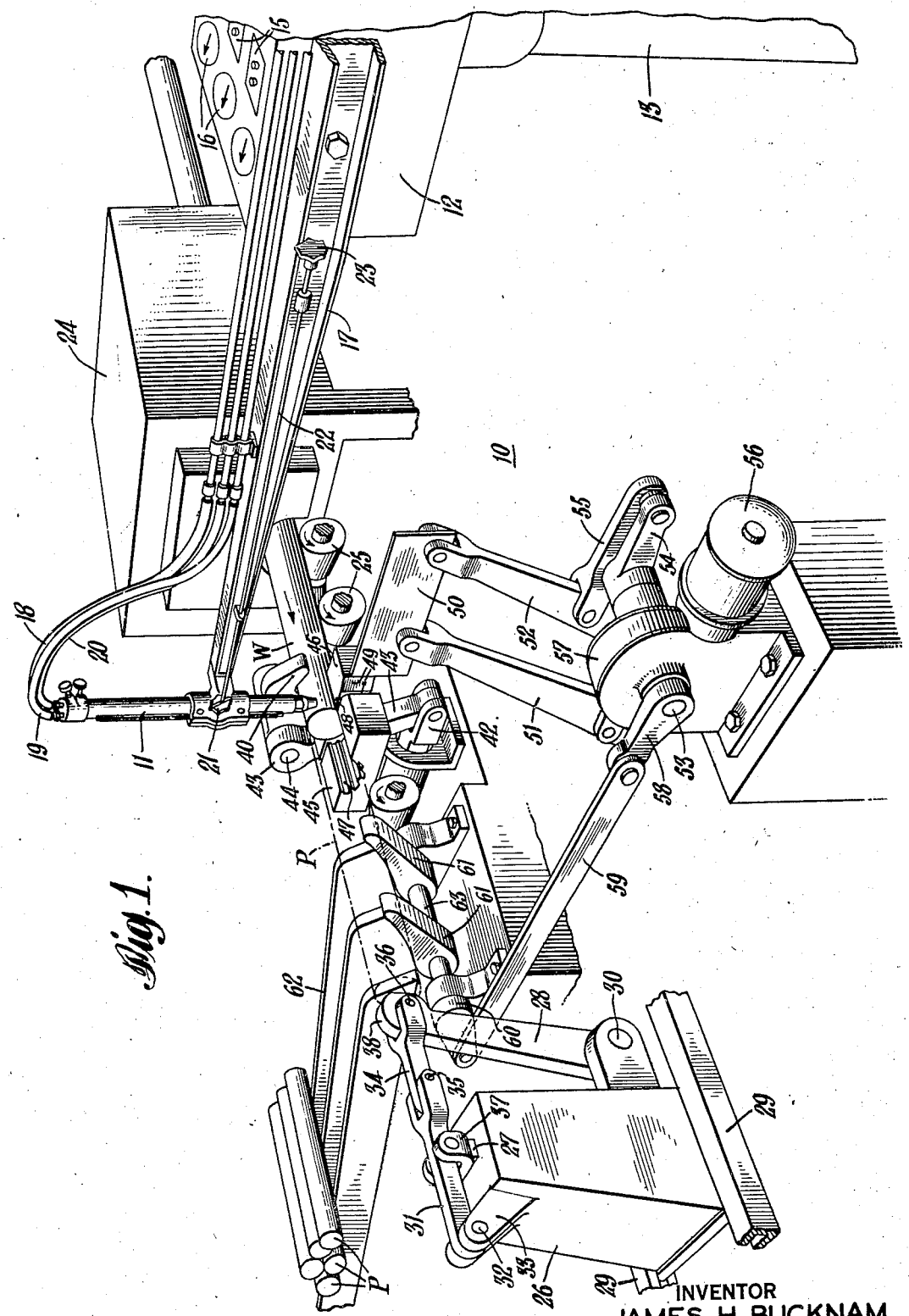

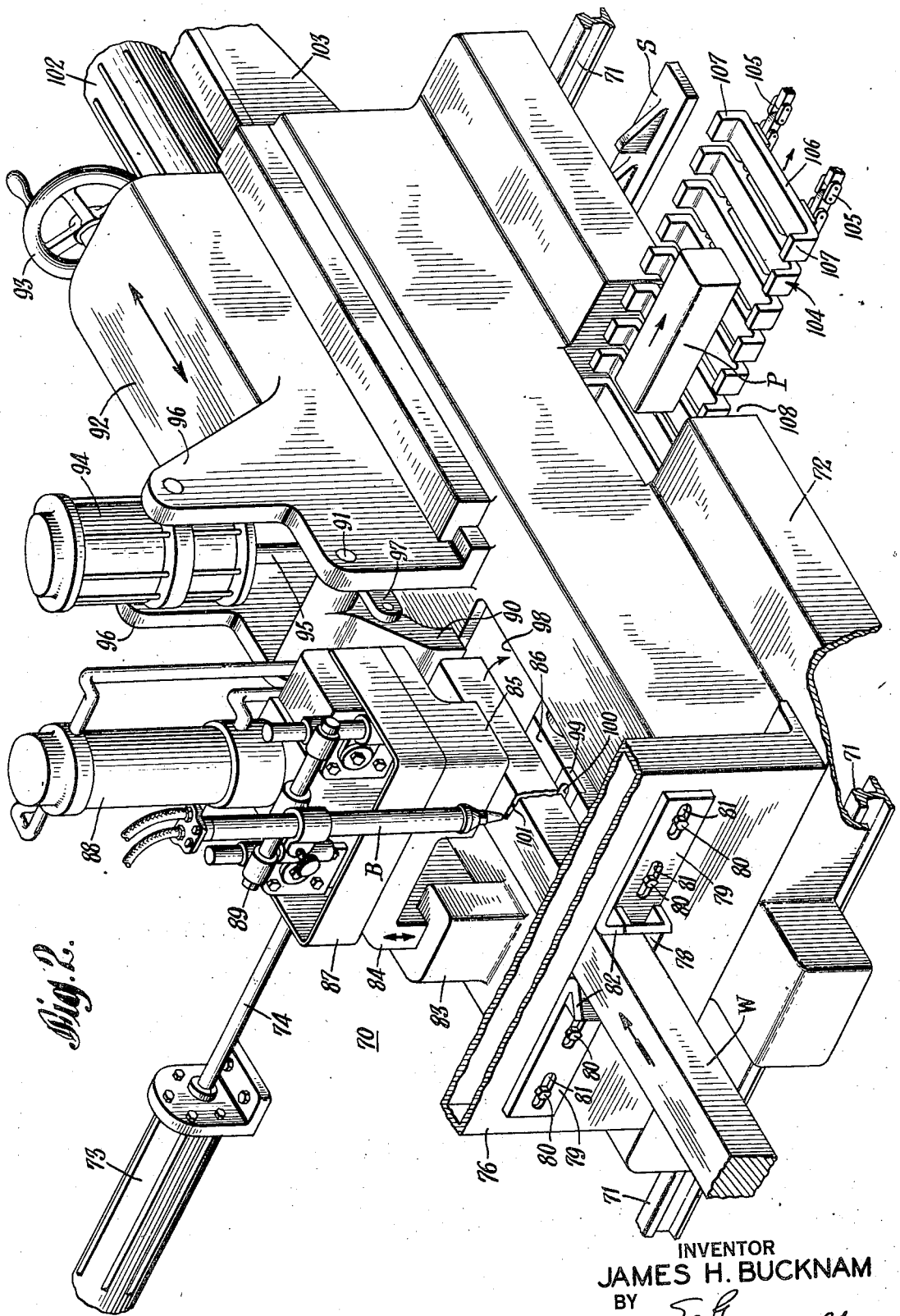

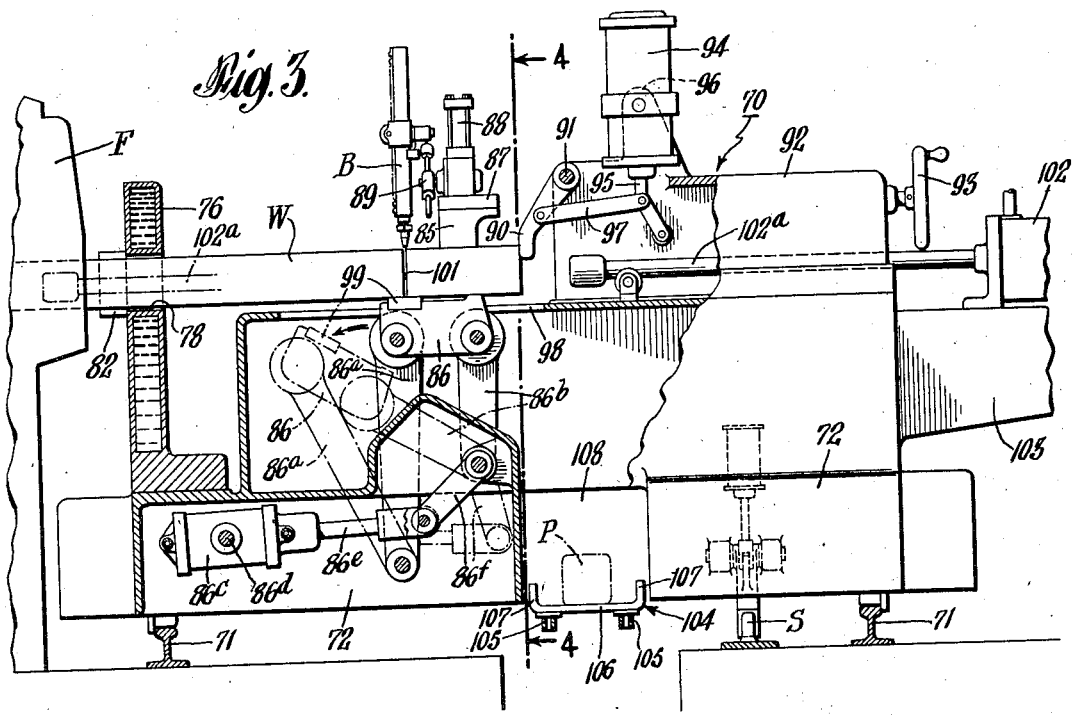
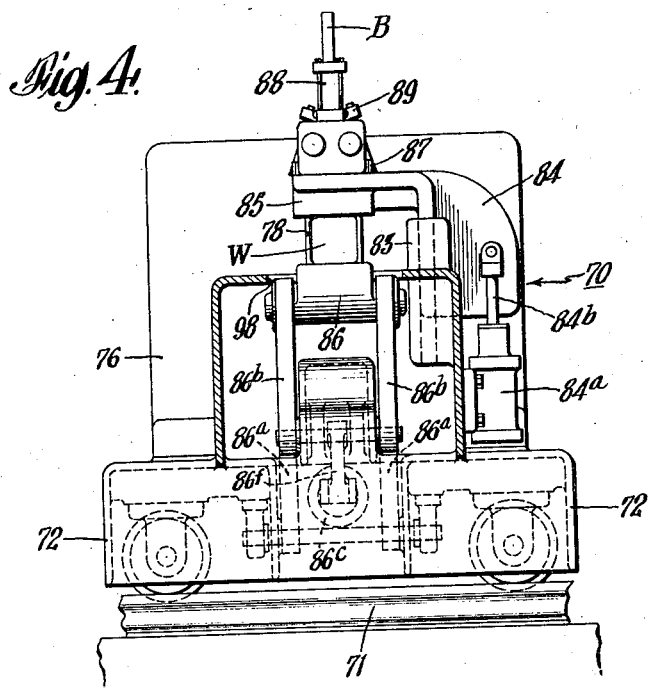

2,302,182

UNITED STATES PATENT OFFICE 2,302,182

BAR CUTTING MACHINE AND PROCESS

James H. Bucknam, Cranford, N. J., assignor to The Linde Air Products Company, a corporation of Ohio Application June 6, 1941, Serial No. 396,941

20 Claims. (Cl. 148—9)

This application, in part, is a continuation of application Serial No. 354,500, filed August 28, 1940, for Bar cutting machine and process.

This invention relates to thermochemically working metal and particularly to an improved method of and apparatus for thermochemically severing elongated work, such as ferrous metal bars, into relatively short pieces.

It is well known that iron or steel, when heated above a red heat, combines with pure oxygen so rapidly that it actually burns. Thus, if a spot on a piece of ferrous metal is heated red hot and subjected to a jet of oxygen, the iron will begin to burn vigorously. Heat is generated as the iron and oxygen combine to form iron oxide. The heat generated by the burning iron is sufficient to form a slag that runs off so as to expose more iron to the oxygen jet. The jet can thus be moved along producing a clean cut. Conventional thermochemical cutting of this character involves the use of a cutting blow-pipe which has, in addition to a central opening that supplies the oxygen jet, means for producing a number of small oxyacetylene heating flames. Two or more of such flames are generally arranged symmetrically around the central opening in the cutting nozzle of the blowpipe. The preheating flames remain burning while the cutting is in progress in order to make up for the radiated heat lost at the surface. It is well known that oxy-acetylene cutting provides a rapid and economical method of severing steel, wrought iron, cast iron and the like. Because oxy-acetylene cutting is a thermochemical process, the thickness of the metal to be cut imposes relatively little difficulty as compared with mechanical processes of severing.

However, when ferrous metal bodies are flame cut with the aid of an oxy-acetylene cutting blowpipe, slag is produced by the cutting reaction which flows downwardly through the cut or kerf and falls away from the work. Some of the liquid slag tends to collect on the surfaces of the work immediately adjacent the bottom edges of the kerf. Slag accumulations of this nature are particularly troublesome when the work is cut at a relatively high rate of speed while the work is hot, because they adhere quite firmly to the severed work and conventional removal thereof presents a difficult problem. Thus, when ingots are hot rolled into billets and then into bars in a steel mill, the work becomes elongated and is usually cut up into convenient pieces of relatively short length while the metal is hot. In the manufacture of steel tubing, hot round bars are cut into pieces of predetermined length and pierced while hot. A clean-cut end is highly desirable for the piercing operation.

It has already been proposed that such bars may be cut into pieces of the desired length by flame cutting at relatively high speed while the work is hot. This causes a large portion of the resulting slag formation to collect on the underside of the cut edges, which subsequently solidifies and tenaciously adheres thereto. Such adherence is thought to be due to the fact that free iron is present in the molten slag and forms a rather complete joint between the slag and the base metal. The highly heated molten slag welds to the surface on which it collects, and such slag formations are very undesirable and difficult to remove.

It has been proposed to remove such slag formations while the work is relatively hot by means of apparatus into which the severed workpiece is forcibly moved against a spring-loaded ram which reacts to force the work backwardly across a shear which mechanically cuts the slag formation from the work. While such apparatus is more efficient and economical than the prior practice of allowing the severed piece to cool for the purpose of mechanically chipping or grinding off the slag formation, nevertheless, it is not entirely satisfactory because of the large forces involved and the shear itself is subject to slag accumulation due to its hot condition.

It has also been proposed to chill the slag as it emerges from the kerf or cut so that it may be controlled and more readily sheared from the severed work. However, such proposal involves the use of conventional shearing means for removing the chilled slag formation after the severed work has been removed from the slag-chilling means, which requires handling of the severed work between its cutting and shearing stations. Such handling, not only is costly, but causes the severed work to lose heat while being moved from cutting position to the slag shearing station.

Therefore, the main objects of this invention are to provide a new process of and machine for high speed thermochemical cutting which solves the problems and overcomes the disadvantages of the prior art; an automatic or semi-automatic high speed bar cutting machine which is simple and economical in its parts and efficient and effective in operation; an improved process of cutting elongated work into relatively short pieces; an improved method of and means for controlling and shearing slag formation from severed work which is thermochemically cut while hot or cold; improved work handling means in a high speed bar cutting machine and a novel process of and means for controlling and removing slag formation resulting from thermochemical metal working.

Broadly in accordance with the invention, a process of thermochemically removing metal is provided which comprises thermochemically treating work with an oxidizing gas stream while hardening slag formation with a chill block, and shearing the hardened slag from the treated work with the aid of said chill block.

In accordance with the invention there is provided a process of cutting work which comprises heating the work to be cut, subjecting such work while hot to a stream of oxygen, controlling the resulting slag formation, and shearing such slag formation from the work while moving it away from cutting position. The formation of slag may be controlled by chill block means which comprises means for shearing the resulting slag formation from the work. The chill block means or the work or both may be actuated from cutting position to effect the desired slag shearing operation.

According to one aspect, the invention provides a process of cutting elongated bars into relatively short pieces, which comprises feeding a bar longitudinally to a cutting station, thermochemically severing a piece from the bar in the cutting station, chilling the resulting slag formation as it emerges from the cut, and simultaneously discharging the severed piece and shearing the slag formation from the bar and severed piece.

More particularly, according to another aspect of the invention, there is provided a process of cutting elongated ferrous metal bars into relatively short pieces, which comprises feeding a bar longitudinally into a heating station, stopping forward movement of the bar while a portion thereof is heated in the heating station, advancing the heated portion of the bar to a cutting station, stopping the forward movement of the bar while the heated portion is severed from the bar and a succeeding portion is being heated in the heating station, thermochemically severing the heated portion of the bar in the cutting station, chilling the resulting slag formation as it emerges from the cut, moving the severed piece out of cutting position while shearing slag formation from the hot bar and severed piece, and discharging the severed piece from the path of the bar.

Broadly, in accordance with the invention, there is provided a machine comprising the combination with means for thermochemically treating work with a stream of oxidizing gas which results in the formation of slag along a zone adjacent the treated area, of means for controlling and removing the slag from the treated work comprising a slag hardening instrumentality disposed for cooperation with the zone to chill the molten slag while the work is being thermochemically treated, and slag removing means including such instrumentality for shearing the resulting hardened slag formation from the treated work.

Further, in accordance with the invention, there is provided a cutting machine comprising the combination with means for severing work which results in the formation of slag along opposite edges of the severed work, of means for cleaning the slag from the severed work comprising slag controlling chill block means adapted for cooperation with the work while being severed, and slag shearing means including the chill block means for cleaning slag from the edges of the severed work. The slag shearing means preferably includes means for moving the severed work relatively to the chill-block means and out of cutting position.

More particularly, there is provided in accordance with the invention, in a cutting machine, the combination with work severing means which incidentally causes slag to form on edges of the severed work, of slag controlling and cleaning means comprising a cutting station provided with work supporting chill-block means for controlling the formation of slag while the work is being severed, loading means including a work stop for initially locating the work in cutting position, means for momentarily actuating the work stop to move the severed work across the chill-block means to shear slag formation therefrom, means acting to retract the work stop, means for removing the severed work from the path of the work to be severed, and means responsive to the operation of the last-named means for cleaning the chill-block means.

In accordance with the invention, there is also provided in combination with a plurality of substantially parallel bar heating stations, a cutting machine adapted for movement transversely thereof into bar receiving position with respect to a selected one of the heating stations, driving means for moving the machine into such position, and locating means for locking the machine in such position. The cutting machine comprises chill-block means adapted to shear slag from the severed work and discharge the severed piece from cutting position, a work clamp on which is mounted the cutting blowpipe and its operating mechanism, driving means mounted on the machine for moving a bar from the machine back into its heating station for further heating, and conveyor means for receiving severed pieces as they are discharged from cutting position by the operation of the chill-block means in shearing slag from the severed work.

The invention is particularly concerned with apparatus for the high speed cutting of hot round or square bars, comprising a parallel link arrangement for controlling movement of a cutting blowpipe, means for placing the metal bars in position for cutting, two chill blocks for slag control, means including at least one of the chill blocks for shearing the slag from the work, and means for discharging the severed piece from the machine and placing it on another conveyor or on a storage rack. In a modified form of the machine, the severed piece is discharged onto a conveyor by a discharging movement of the chill blocks in shearing slag therefrom. The machine is adapted to operate either automatically or semi-automatically, the latter operation being initiated by an operator so that the process of cutting each piece is automatically carried out and the machine restored to its original condition.

The novel features which are believed to be characteristic of this invention are set forth with particularity in the appended claims. The invention itself, however, both as to its organization and method of operation, together with further objects thereof, will best be understood by reference to the specification taken in connection with the accompanying drawings.

Fig. 1 is a fragmentary perspective view of an automatic high speed round bar cutting machine embodying features of the invention;

Fig. 2 is a fragmentary perspective view of a square bar cutting machine embodying features of the invention;

Fig. 3 is a fragmentary view partially in side elevation and partially in section of the square bar cutting machine shown in Fig. 2; and Fig. 4 is a view in vertical cross section taken on line 4—4 of Fig. 3.

Referring particularly to Fig. 1 of the drawings, there is illustrated an automatic high speed round bar cutting machine 10 comprising a cutting blowpipe 11 mounted on a blowpipe operating head 12 which is supported by a column 13 securely fastened to the floor. Mounted on the blowpipe operating head 12 are the necessary electrical switches 15 and gauges 16 for controlling the operation of the machine 10. Since the blowpipe operating head 12 in itself forms no part of the present invention, it is not described in detail herein, but for a complete explanation thereof reference may be had to application Serial No. 331,694, filed by James H. Bucknam and Lloyd W. Young on April 26, 1940, entitled "Blowpipe machine," patented May 19, 1942, No. 2,283,346.

For cutting round bars, a blowpipe supporting arm 17 may be pivotally fastened to a pair of spur gears within the head 12 or to an arm operated thereby, at a point, the distance of which from the axis on which the spur gear revolves, is equal to the radius of the bar to be thermochemically severed by the blowpipe 11. For cutting square bars, a slightly different arrangement is necessary which is also made clear in the application noted above. To one of the spur gear shafts is fastened a cam which operates a valve for controlling the forward speed of a hydraulic actuator, thereby varying the speed of the cutting blowpipe 11 inversely as the thickness of the bar varies at the point of cutting. Cutting oxygen and preheat gases are supplied to the blowpipe 11 by way of flexible hoses 18, 19 and 20. The blowpipe 11 is attached to arm 17 for vertical adjustment by means including an adjusting mechanism 21. Such mechanism 21 is provided with a control rod 22 having a handle 23 which when turned is adapted to move the blowpipe 11 upwardly or downwardly, facilitating rapid adjustment of the blowpipe 11 with respect to the work W, especially when hot.

In the longitudinal path of movement of the work W to be cut by the blowpipe 11, there is provided a heating station preferably comprising a furnace 24 in which the work W is heated to a desired temperature. Suitable conveyor means comprising rollers 25 are adapted to feed the work W, such as a round bar, from the heating station 24 to an oxy-acetylene cutting station in which the blowpipe 11 is located. At the cutting station there is provided a housing 26 containing a hydraulic piston 27, the housing 26 being mounted for sliding adjustment between longitudinal way members 29, 29. In the normal upper position of the piston 27, an arm 28, which is pivotally connected to the housing 26 at 30, is retraced by virtue of an actuating mechanism comprising an arm 31 pivoted at 32 to an extension 33 on the housing 26, and a link 34 pivotally connected at 35 to the arm 31 and to the upper end of arm 28 at 36; the arm 31 being connected to the piston 27 by means including a clevis 37. Thus, the upper end 38 of the arm 28 constitutes a work stop which is adapted to be contacted by the forward end of the work W and assists the feeding mechanism in properly positioning the bar W in the cutting station. The length of a piece P to be severed from the work W is readily predetermined by adjusting the position of housing 26 on the way members 29, 29.

The work feeding mechanism is coupled to the work positioning stop 38 in such manner that when the outer end of the bar W strikes the stop 38, the feed rollers 25 are automatically stopped, with the work in cutting position. The bar W is then adapted to be clamped in such position by a clamp 40 which is automatically operated by a hydraulic piston rod 42, crank 43, and shaft 44. Thus, when the piston 42 is actuated, the clamp 40 engages the bar W.

Suitably positioned in the work cutting station are two slag controlling chill blocks 45, 46 which may be kept cool internally by any suitable cooling medium, such as water, which is circulated therethrough. The blocks 45, 46 are provided with a serrated channel 47 for receiving the bar W, and for cooperation with the clamp 40 in securing the work in fixed position during the severing operation. The blocks 45, 46 are spaced from each other to provide a slot 48 therebetween for the slag resulting from the operation of blowpipe 11. The opposite faces of the blocks 45, 46 are inclined at 49, 49 to provide a mouth for the reception of a cleaning plate or blade 50 which is mounted on arms 51 and 52 to form a parallel linkage.

The arm 52 is connected to a drive shaft 53 by a crank 54 and a link 55, so that, as the shaft 53 is turned counter-clockwise, the slag cleaning blade 50 is advanced through the mouth 49 into the slot 48 and out again, thereby automatically ejecting chilled slag from the slot 48 between the chill blocks 45, 46, after each cutting operation. Shaft 53 is connected to a driving motor 56 through suitable gearing within a housing 57, which is adapted to turn the shaft 53 through one complete revolution following each cutting operation.

The shaft 53 is also connected to a work discharging mechanism shaft 63 through a crank 58, a link 59 and a crank 60. The arrangement is such that, when the shaft 53 is turned counter-clockwise, severed-work discharging arms 61, 61 are turned counter-clockwise to raise and discharge the workpiece P onto a work receiving table 62 which is inclined so that the pieces P deposited thereon roll away from the path of the arms 61.

In considering the operation of the automatic high speed cutting machine shown in Fig. 1, a bar W is first fed to the furnace 24 wherein its forward end portion is heated to the desired temperature. The work W is then advanced until the heated portion is properly positioned in the cutting station by the forward end of the bar W striking the stop 38, which acts to stop the rollers 25. The clamp 40 then engages the work through the operation of hydraulic piston rod 42. The valves for controlling the supply of preheating gas to the cutting blowpipe 11 are then automatically opened and the resulting jets ignited. Upon completion of the preheating period, the cutting oxygen valve is opened and the cut is started on the work W. The slag, forced from the kerf in making the cut, is confined and frozen in the slot 48 between the water cooled blocks 45, 46.

Upon completion of the cut, the cutting blowpipe 11 is returned to its starting position, and simultaneously therewith, clamp 40 releases the work W. Hydraulic piston 27 thereupon automatically acts to push stop 38 against the severed piece P with sufficient force to cause both the piece P and the remainder of the bar W to be moved rearwardly about two inches, shearing slag formation from the ends of the severed work, the chill blocks 45, 46 acting as shearing means; and the stop 38 is retracted to its normal position. The shearing operation being completed, the severed piece P is discharged by the turning of arms 61 and the slag cleaning blade 50 is advanced and retracted by the cyclic operation of motor 56; and the parts are all restored to their initial positions. Each of the various work handling elements of the combination preferably is automatically restored to its initial position upon completion of its function, so that, upon completion of the necessary steps, the machine as a whole is ready for starting and repeating another cycle, which may be automatically or manually initiated.

Referring particularly to Figs. 2, 3 and 4 of the drawings, there is illustrated a square bar cutting machine 70 comprising a pair of supporting rails 71, 71 having mounted thereon a base 72 which is adapted to be adjusted longitudinally of the rails 71 and transversely with respect to a plurality of substantially parallel bar heating stations in a furnace F, by a hydraulic mechanism comprising a cylinder 73 and a piston provided with a rod 74 which is connected to the base 72. A stop S is provided which, together with a suitable ratchet, ratchet operating cylinder and cylinder 73, stabilizes the machine at any desired position. Mounted on the base 72 adjacent the work receiving end thereof is a hollow upright baffle wall 76 adapted to contain a cooling medium, such as water, to protect the apparatus as well as the blowpipe B from the heat of the furnace F. The wall 76 is provided with a substantially square opening 78 for the passage of a selected square bar W. Adjustably mounted on the face of the wall 76 are a pair of plates 79, 79 which are held in adjusted position by bolts 80; the plates being provided with longitudinal slots 81 for the passage of the bolts 80. The inner ends of the plates 79 are provided with vertical flanges 82 which are inclined outwardly for cooperation with the forward end of the work W to guide the latter through the opening 78.

Mounted for vertical movement in a suitable upright 83 on the base 72 is a work clamp 84 having a work engaging portion 85 adapted to cooperate with a work supporting chill block 86. Vertical movement of the clamp 84 is automatically effected by any suitable means, preferably hydraulic, such as cylinder 84a having its piston connected to clamp 84 through a rod 84b. Mounted on the upper surface of the clamp 84 is a cutting blowpipe mechanism comprising a supporting base 87, a hydraulic cylinder 88 and the work cutting blowpipe B. The cutting blowpipe B is connected to the base 87 by a suitable movement controlling mechanism 89 which may be of the type which is disclosed and claimed in copending application Serial No. 331,693 filed by Lloyd W. Young on April 26, 1940, entitled "Blowpipe machine," patented May 19, 1942, No. 2,283,346.

For the purpose of the present invention, it is sufficient to say that the mechanism 89, operated by the hydraulic cylinder 88, is adapted automatically to control movement of the blowpipe B so that the latter efficiently and effectively cuts the hot work W transversely to produce a severed piece P.

The work W is positioned in the cutting station in the machine 70 by a stop or bumper 90 which is pivotally mounted at 91 at the forward end of a slide 92 mounted for longitudinal adjustment between suitable ways on the base 72. Longitudinal adjustment of the slide 92 to produce workpieces P of any desired length is effected by a suitable screw mechanism provided with a handle 93. A hydraulic cylinder 94 having a piston rod 95 is pivotally mounted on the slide 92 between uprights 96, 96 thereon, for operating the tilting bumper 90 through a toggle mechanism including links 97. Thus, the hydraulic mechanism 94 is adapted to position the bumper 90 for stopping forward movement of the work W to be cut, and then swing the bumper rearwardly and upwardly out of the way of the subsequently severed piece P when the latter is discharged forwardly.

The work supporting chill block 86 mounted on the base 72 of the machine below an opening 98 therein, is provided with a shear plate 99 having a slot 100 for the passage of slag produced by the blowpipe B in making a kerf 101 across the work W. The block 86 is preferably hollow for containing a circulating cooling medium, such as water, to prevent overheating from contact with the work W when the latter is hot. For discharging the severed piece P and shearing slag formation from the work, the chill block 86 is mounted on long links 86a and short cranks 86b for forward tilting movement when actuated by a hydraulic mechanism including a cylinder 86c pivotally supported at 86d in the base 72 and having a piston connected to cranks 86b through a rod 86e and a crank arm 86f. In this shearing operation slag accumulation is cleaned from the bottom edges of the kerf while the piece P is being discharged. A hydraulic mechanism 102 mounted on bracket 103 is adapted, through a rod 102a, to move the remaining work rearwardly out of the cutting machine and back into its heating station in the furnace F for reheating.

A conveyor 104 comprising chains 105, 105 and cross bars 106 having up-turned ends 107 is suitably mounted so as to travel in a way 108 provided therefor in the cutting machine base 72 and under the opening 98 whereby the workpieces P fall thereon by gravity as they are discharged from the machine.

In considering the operation of the square bar cutting machine shown in Fig. 2, the carriage base 72 of the machine is moved on the rails 71, 71 by the hydraulic mechanism 73 to position the opening 78 in the wall 76 in line with the forward path of movement of the desired work W. The work W thereupon is advanced and enters the cutting machine 70 through the opening 78, the forward end of the work being properly guided by the inclined vertical flanges 82 of the horizontally adjustable plates 79. The square bar W is moved forwardly until its end engages the bumper 90 which stops further forward movement of the work W and controls the length of the piece P to be severed therefrom. The work clamp 84 then automatically clamps the work W in cutting position on the chill block 86 and vertically locates the discharge end of the blowpipe B in proper position with respect to the work W.

The blowpipe operating mechanism 89 thereupon proceeds to move the cutting blowpipe B which acts thermochemically to sever the piece P from the work W. After the work W has been severed by the cutting blowpipe B, the clamp 84 is released and the hydraulic mechanism 86a to 86f advances and tilts the chill block 86 which shears slag from the work W and piece P as the latter is discharged from cutting position. This causes the workpiece P to fall downwardly through opening 98 and into the discharge conveyor 104. The hydraulic mechanism 94 operates to swing the bumper 90 rearwardly and upwardly out of the discharge path of movement of the severed piece P, and then back in front of the work W as the latter is subsequently fed forward to be cut again.

The slag control and removal feature of the invention is not restricted to cutting or severing, but is applicable to any thermochemical treatment which results in the formation of slag along a zone adjacent the thermochemically treated area, such as in flame-gouging, flame-scarfing, flame-machining, flame-grooving, flame-piercing, and the like.

While there have been described what are at present considered to be preferred embodiments of this invention, it will be obvious to those skilled in the art that various changes and modifications may be made therein without departing from the invention, and it is therefore intended in the appended claims to cover all such changes and modifications as fall within the true spirit and scope of the invention.

What is claimed is:

1. A machine for thermochemically removing metal from work, comprising the combination with means for thermochemically treating work with a stream of oxidizing gas which results in the formation of slag along a zone adjacent the treated area, of means for controlling and removing said slag from the treated work comprising a slag hardening instrumentality disposed for cooperation with said zone to chill the molten slag by contact therewith while the work is being thermochemically treated with said stream of oxidizing gas, and slag removing means including said instrumentality for shearing resulting hardened slag formation from the treated work.

2. A bar cutting machine comprising a thermochemical cutting station for receiving a bar to be cut, bar feeding means for delivering the bar to said cutting station, chill-block means for controlling slag formation at said cutting station, blowpipe means for thermochemically severing said bar so that the resulting slag formation is controlled by said chill-block means, and slag shearing means including said chill-block means for mechanically removing said slag formation from the severed bar.

3. A bar cutting machine comprising a thermochemical cutting station for receiving a bar to be cut, bar feeding means for delivering the bar to said cutting station, chill-block means at said cutting station, bar clamping means including said chill-block means for securing said bar in cutting position, and blowpipe means for thermochemically severing said bar so that the resulting slag formation is controlled by said chill-block means.

4. A hot bar cutting machine comprising chill-block means adapted to receive slag resulting from a thermochemical bar severing operation, thermochemical cutting means for severing a hot bar so that resulting slag formation is received by said chill-block means, and slag shearing means for mechanically removing said slag formation from the hot bar while actuating at least a piece severed from the latter with respect to its cutting position.

5. A bar cutting machine comprising a stop adapted to limit longitudinal feeding movement of a bar into cutting position, means for cutting said bar which incidentally causes slag to adhere to the edges of the severed bar, means for chilling said slag, actuating means for moving said stop from its normal position to move said severed bar across said slag chilling means to thereby shear said slag from said severed bar, a slide supporting said stop and actuating means, and means for adjusting said slide to determine the length of a piece to be cut from said bar.

6. A cutting machine comprising, in combination, loading means for placing work in position to be cut, a pair of chill blocks for slag control, blowpipe means for severing a piece from the work, work actuating means for shearing slag therefrom, and discharge means for removing the severed piece from the machine.

7. In a cutting machine, the combination with work severing means which incidentally causes slag to form on edges of the severed work, of slag controlling and cleaning means comprising a cutting station provided with work-supporting chill-block means for controlling the formation of slag while the work is being severed, loading means including a work stop for initially locating the work in said cutting station, and means for momentarily actuating said work stop to move the severed work across said chill-block means to shear slag formation therefrom.

8. A cutting machine comprising the combination with means for severing work which results in the formation of slag along opposite edges of the severed work, of means for cleaning said slag from the severed work comprising slag controlling chill-block means adapted for cooperation with the work while being severed, work feeding means for advancing the work longitudinally across said chill-block means, a work bumper cooperating with said work feeding means for positioning the work for cutting, and means for actuating said work bumper to force the severed work rearwardly with respect to said chill-block means before the severed work is subsequently advanced by said work feeding means.

9. An automatic work cutting machine comprising the combination of a furnace for heating work to be severed, means for feeding the heated work to a cutting position, a clamp for securing the work in cutting position, thermochemical means for severing the work while hot, chill-block means for controlling slag formation during the severing operation, means for moving the severed ends of the work with respect to said chill-block means to shear adhering slag therefrom, means for discharging the severed work, and means for cleaning slag from said chill-block means.

10. In a cutting machine, the combination with work severing means which incidentally causes slag to form on edges of the severed work, of slag controlling and cleaning means comprising a cutting station provided with work-supporting chill-block means for controlling the formation of slag while the work is being severed, loading means including a work stop for initially locating the work in said cutting station, means for momentarily actuating said work stop to move the severed work across said chill-block means to shear slag formation therefrom, means acting to retract said work stop, means for removing the severed work from the path of the work to be severed, and means responsive to the operation of said last-named means for cleaning said chill-block means.

11. In combination with a plurality of substantially parallel bar heating stations, a bar cutting machine mounted for movement transversely thereof into bar receiving position with respect to a selected one of said heating stations, driving means for moving said machine into such position, locating means for locking said machine in such position, and means for moving a bar longitudinally between said selected heating station and said bar receiving position.

12. In combination with a plurality of substantially parallel bar heating stations, a bar cutting machine as defined by claim 11, provided with means for moving a bar from the machine and back into its heating station.

13. A thermochemical work cutter which produces molten slag in severing work in a cutting position, comprising slag chilling means positioned to chill said molten slag and adapted to shear the chilled slag from the severed work and discharge the severed piece from cutting position.

14. A thermochemical cutting machine comprising a work clamp including opposed work-engaging jaws one of which consists of chill-block means, and a work cutting blowpipe mounted on said clamp for directing molten slag produced by a cutting operation into contact with said chill-block means to harden said slag.

15. A bar cutting machine comprising thermochemical means for severing a relatively short piece from a bar of ferrous metal, chill-block means adapted to receive slag resulting therefrom, and means supporting said chill-block means for tilting movement from slag receiving position to discharge said severed piece free of slag formation.

16. Process of thermochemically removing metal which comprises thermochemically treating work with an oxidizing gas stream while hardening a resulting slag formation with a chill block, and shearing the hardened slag from the treated work with said chill block.

17. Process of cutting work which comprises heating the work to be cut, severing such work while hot with a stream of oxygen, subjecting the work while being cut by said stream of oxygen to chill-block means for controlling slag formation, and using said chill-block means to sever adhering slag from the severed work by moving the cut end of the severed work across said chill-block means.

18. Process of cutting work which comprises heating the work to be cut, severing such work while hot with a stream of oxygen, subjecting the work while being cut by said stream of oxygen to chill-block means for controlling slag formation, and using said chill-block means to sever adhering slag from the severed work.

19. Process of cutting elongated ferrous metal bars into relatively short pieces, which comprises feeding a bar longitudinally into a heating station, stopping forward movement of said bar while a portion thereof is heated in said station, advancing the heated portion of said bar to a cutting station, stopping the forward movement of said bar while said heated portion is severed from the bar and a succeeding portion is being heated in said heating station, thermochemically severing said heated portion of said bar in said cutting station, chilling the resulting slag formation as it emerges from the cut, subjecting the severed piece to a sharp impact which longitudinally moves it and the remaining bar across a stationary shear to remove adhering chilled slag formation from the hot bar and severed piece, and discharging the severed piece from the path of the bar.

20. Process of cutting elongated bars into relatively short pieces, which comprises feeding a bar longitudinally to a cutting station, thermochemically severing a piece from said bar in said cutting station, chilling the resulting slag formation as it emerges from the cut, and simultaneously discharging the severed piece and shearing said slag formation from the bar and severed piece.

JAMES H. BUCKNAM.